US008583692B2

(12) United States Patent  
Ganesh et al.

(10) Patent No.: US 8,583,692 B2  
(45) Date of Patent: Nov. 12, 2013

(54) DDL AND DML SUPPORT FOR HYBRID COLUMNAR COMPRESSED TABLES

(75) Inventors: Amit Ganesh, San Jose, CA (US); Vikram Kapoor, Cupertino, CA (US); Vineet Marwah, San Ramon, CA (US); Kam Shergill, Maidenhead (GB); Roger MacNicol, Hummelstown, PA (US); Sachin Kulkarni, Sunnyvale, CA (US); Jesse Kamp, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/871,882

(22) Filed: Aug. 30, 2010

(65) Prior Publication Data

US 2011/0029569 A1 Feb. 3, 2011

Related U.S. Application Data

(63) Continuation-in-part of application No. 12/617,669, filed on Nov. 12, 2009.

(60) Provisional application No. 61/174,447, filed on Apr. 30, 2009.

(51) Int. Cl.  
*G06F 17/30* (2006.01)

(52) U.S. Cl.  
USPC ........... 707/796; 707/812; 707/769; 707/693; 711/114; 711/112

(58) Field of Classification Search  
USPC .......... 707/796, 693, 769, 812; 711/114, 112; 382/243  
See application file for complete search history.

(56) References Cited

U.S. PATENT DOCUMENTS

| 5,263,145 | A | * | 11/1993 | Brady et al. | ................. | 711/114 |
| 5,506,979 | A | * | 4/1996 | Menon | .......................... | 711/112 |
| 5,546,575 | A | | 8/1996 | Potter et al. | | |
| 5,699,457 | A | * | 12/1997 | Adar et al. | .................... | 382/239 |
| 5,794,229 | A | | 8/1998 | French et al. | | |
| 5,867,723 | A | * | 2/1999 | Chin et al. | ...................... | 712/11 |
| 5,995,080 | A | * | 11/1999 | Biro et al. | ..................... | 345/603 |

(Continued)

OTHER PUBLICATIONS

Loshin, D., "Gaining the Performance Edge Using a Column-Oriented Database Management System" (2009), 12 pages.

(Continued)

*Primary Examiner* — Jean M Corrielus  
(74) *Attorney, Agent, or Firm* — Hickman Palermo Truong Becker Bingham Wong LLP

(57) ABSTRACT

Techniques for storing and manipulating tabular data are provided. According to one embodiment, a user may control whether tabular data is stored in row-level or column-major format. Furthermore, the user may control the level of data compression to achieve an optimal balance between query performance and compression ratios. Tabular data from within the same table may be stored in both column-major and row-major format and compressed at different levels. In addition, tabular data can migrate between column-major format and row-major format in response to various events. For example, in response to a request to update or lock a row stored in column-major format, the row may be migrated and subsequently stored into row-major format. In one embodiment, table partitions are used to enhance data compression techniques. For example, compression tests are performed on a representative table partition, and a compression map is generated and applied to other table partitions.

40 Claims, 10 Drawing Sheets

(56) References Cited

U.S. PATENT DOCUMENTS

| | | | |
|---|---|---|---|
| 6,216,125 B1 | 4/2001 | Johnson | |
| 6,959,300 B1 | 10/2005 | Caldwell et al. | |
| 7,079,056 B2* | 7/2006 | Weaver | 341/106 |
| 7,126,992 B2 | 10/2006 | Chiang et al. | |
| 7,469,266 B2* | 12/2008 | Gustavson et al. | 708/520 |
| 7,496,589 B1 | 2/2009 | Jain et al. | |
| 7,552,130 B2 | 6/2009 | Cook et al. | |
| 7,558,290 B1 | 7/2009 | Nucci et al. | |
| 7,693,325 B2* | 4/2010 | Pulla et al. | 382/154 |
| 7,707,194 B2* | 4/2010 | Bresch et al. | 707/704 |
| 7,720,878 B2 | 5/2010 | Caldwell et al. | |
| 8,099,440 B2* | 1/2012 | Johnson et al. | 707/802 |
| 8,296,517 B2* | 10/2012 | Potapov et al. | 711/114 |
| 2002/0194428 A1 | 12/2002 | Green | |
| 2003/0212694 A1* | 11/2003 | Potapov et al. | 707/100 |
| 2004/0139099 A1* | 7/2004 | Weaver | 707/101 |
| 2005/0166083 A1 | 7/2005 | Frey et al. | |
| 2005/0210054 A1 | 9/2005 | Harris | |
| 2007/0109155 A1 | 5/2007 | Fallon | |
| 2008/0050025 A1 | 2/2008 | Bashyam et al. | |
| 2008/0071818 A1 | 3/2008 | Apanowicz et al. | |
| 2008/0162523 A1 | 7/2008 | Kraus et al. | |
| 2008/0294863 A1 | 11/2008 | Faerber et al. | |
| 2009/0106210 A1 | 4/2009 | Slezak et al. | |
| 2009/0106281 A1 | 4/2009 | Marwah et al. | |
| 2009/0287737 A1 | 11/2009 | Hammerly | |
| 2010/0278446 A1 | 11/2010 | Ganesh et al. | |
| 2010/0281004 A1 | 11/2010 | Kapoor et al. | |
| 2010/0281079 A1 | 11/2010 | Marwah et al. | |
| 2011/0047330 A1* | 2/2011 | Potapov et al. | 711/114 |
| 2011/0295817 A1* | 12/2011 | Chandrasekar et al. | 707/693 |
| 2012/0143833 A1 | 6/2012 | Ganesh et al. | |
| 2013/0036101 A1 | 2/2013 | Marwah | |

OTHER PUBLICATIONS

"C-Store: A Column-Oriented DBMS" downloaded from the Internet Apr. 1, 2010 < http://db.csail.mit.edu/projects/cstore/#papers > 4 pages.

Stonebraker, M. et al., "C-Store: A Column-oriented DBMS", Proceedings of the 31$^{st}$ VLDB Conference, Trondheim, Norway 2005 (12 pages).

Abadi, D. et al., "Integrating Compression and Execution in Column-Oriented Database Systems" Sigmod 2006 (12 pages).

Rabb, David, "How to Judge a Columnar Database", Information Management, website http://license.icopyright.net/user/viewFreeUse.act?fuid=MTMxMDAzMjU%3D, dated Dec. 14, 2007, 2 pages.

MacNicol Roger et al, "Sybase IQ Multiplex-Designed for Analytics", Proceedings of the 30$^{th}$ VLBD Conference, dated 2004, 4 pages.

U.S. Appl. No. 12/617,669, filed Nov. 12, 2009, Restriction Requirement, Sep. 20, 2011.

U.S. Appl. No. 12/791,337, filed Jun. 1, 2010, Final Office Action, Nov. 26, 2012.

U.S. Appl. No. 12/769,205, filed Apr. 28, 2010, Office Action, Dec. 6, 2011.

U.S. Appl. No. 12/617,669, filed Nov. 12, 2009, Restriction Requirement, Jan. 3, 2012.

U.S. Appl. No. 12/769,508, filed Apr. 28, 2010, Office Action, Feb. 28, 2012.

U.S. Appl. No. 12/769,205, filed Apr. 28, 2010, Final OA, May 22, 2012.

U.S. Appl. No. 12/617,669, filed Nov. 12, 2009, Final Office Action, Sep. 25, 2012.

U.S. Appl. No. 13/371,354, filed Feb. 10, 2012, Office Action, Sep. 28, 2012.

U.S. Appl. No. 12/791,337, filed Jun. 1, 2010, Advisory Action, Feb. 11, 2013.

U.S. Appl. No. 12/769,205, filed Apr. 28, 2010, Final Office Action, May 22, 2012.

Rabb, David, "How to Judge a Columnar Database", Information Management, website http://license.icopyright.net/user/viewFreeUse.act?fuid=MTMxMDAzMjU%3D, dated Dec. 14, 2007, 2 pages.

MacNicol Roger et al, "Sybase IQ Multiplex-Designed For Analytics", Proceedings of the 30$^{th}$ VLDB Conference, dated 2004, 4 pages.

Sybase IQ, "Administration Guide", Document ID: 35375-01-1121-02, dated Sep. 19, 1997, 426 pages.

Sybase IQ, "Gaining the Performance Edge Using a Column-Oriented Database Management System", 12 pages, dated Mar. 2009.

Sybase IQ, "An Advanced Columnar Data Warehouse Architecture", Winter Corporation, 17 pages, Dated Jun. 2010.

Winter Corporation, "Demonstrating Efficiency in Large-Scale Data Warehousing", A review of new TPC-H results for the Sun-Sybase IQ Platform, 20 pages, dated in 2003.

D. Florescu et al. "Storing and Querying XML Data Using an RDBMS", Quarterly Bulletin of the Computer Society of the IEEE Technical Committee on Data Engineering, vol. 22, No. 3, Sep. 1, 1999, 8 pages.

Daniel J. Abadi, "Query Execution in Column-Oriented Database Systems", Feb. 29, 2008, retrieved from Internet http://cs-www.yale.edu/homes/dna/papers/abadiphd.pdf, 148 pgs.

U.S. Appl. No. 12/791,337, filed Jun. 1, 2010, Office Action, mailed Jun. 28, 2013.

U.S. Appl. No. 12/769,205, filed Apr. 28, 2010, Notice of Allowance, mailed Jul. 29, 2013.

U.S. Appl. No. 13/633,091, filed Oct. 1, 2012, Notice of Allowance mailed Aug. 15, 2013.

* cited by examiner

DDL AND DML SUPPORT FOR HYBRID COLUMNAR COMPRESSED TABLES

CROSS-REFERENCE TO RELATED APPLICATIONS; BENEFIT CLAIM

This application claims benefit as a Continuation-in-part of application. Ser. No. 12/617,669 filed Nov. 12, 2009 entitled "STRUCTURE OF HIERARCHICAL COMPRESSED DATA STRUCTURE FOR TABULAR DATA" naming Ganesh et al. as inventors, which claims priority to Provisional Application 61/174,447, filed Apr. 30, 2009, the entire contents of which are hereby incorporated by reference as if fully set forth herein which is incorporated by reference in its entirety for all purposes as if fully set forth herein. The applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 12/769,508 filed on Apr. 28, 2010, entitled "COMPRESSION ANALYZER" naming Kapoor et al. as inventors, which is incorporated by reference in its entirety for all purposes as if fully set forth herein.

This application is related to U.S. patent application Ser. No. 12/769,205 filed Apr. 28, 2010 entitled "STORING COMPRESSION UNITS IN RELATIONAL TABLES" naming Kapoor et al. as inventors, which is incorporated by reference in its entirety for all purposes as if fully set forth herein.

FIELD OF THE INVENTION

The present invention relates to tabular data and, more specifically, to defining data structures for storing and compressing tabular data and manipulating tabular data that has been stored in compression units.

BACKGROUND

Computers are used to store and manage many types of data. Tabular data is one common form of data that computers are used to manage. Tabular data refers to any data that is logically organized into rows and columns. For example, word processing documents often include tables. The data that resides in such tables is tabular data. All data contained in any spreadsheet or spreadsheet-like structure is also tabular data. Further, all data stored in relational tables, or similar database structures, is tabular data.

Logically, tabular data resides in a table-like structure, such as a spreadsheet or relational table, which may comprise an ordered arrangement of rows and columns. However, the actual physical storage of the tabular data may take a variety of forms. For example, although the logical structure of the tabular data may be multidimensional, the tabular data may physically be stored in linear format, such as in row-major or column major format. In row-major format, column values of a row from the table-like structure are stored contiguously in persistent storage. By contrast, in column-major format, for a given column of multiple rows, column values of the column are stored contiguously.

As described in STRUCTURE OF HIERARCHICAL COMPRESSED DATA STRUCTURE FOR TABULAR DATA, a flexible and extensible structure, called a compression unit, may be used to physically store tabular data. For example, compression units may be used to store tabular data from spreadsheets, relational database tables, or tables embedded in word processing documents. Tabular data within compression units may be stored in row-major or column-major format.

Data within a compression unit may be compressed according to a variety of techniques, as described in COMPRESSION ANALYZER. For example, a compression analyzer gives users high-level control over the selection process without requiring the user to know details about the specific compression techniques that are available to the compression analyzer. Users are able to specify, for a given set of data, a "balance point" along the spectrum between "maximum performance" and "maximum compression". The compression analyzer selects the compression technique to use on a set of data by actually testing the candidate compression techniques against samples from the set of data. After testing the candidate compression techniques against the samples, the resulting compression ratios are compared. The compression technique to use on the set of data is then selected based, in part, on the compression ratios achieved during the compression tests performed on the sample data. The selected compression techniques are then used to compress data into a compression unit.

After the tabular data has been compressed into a compression unit, the data may be modified. Described herein are techniques for improving how such modifications are performed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
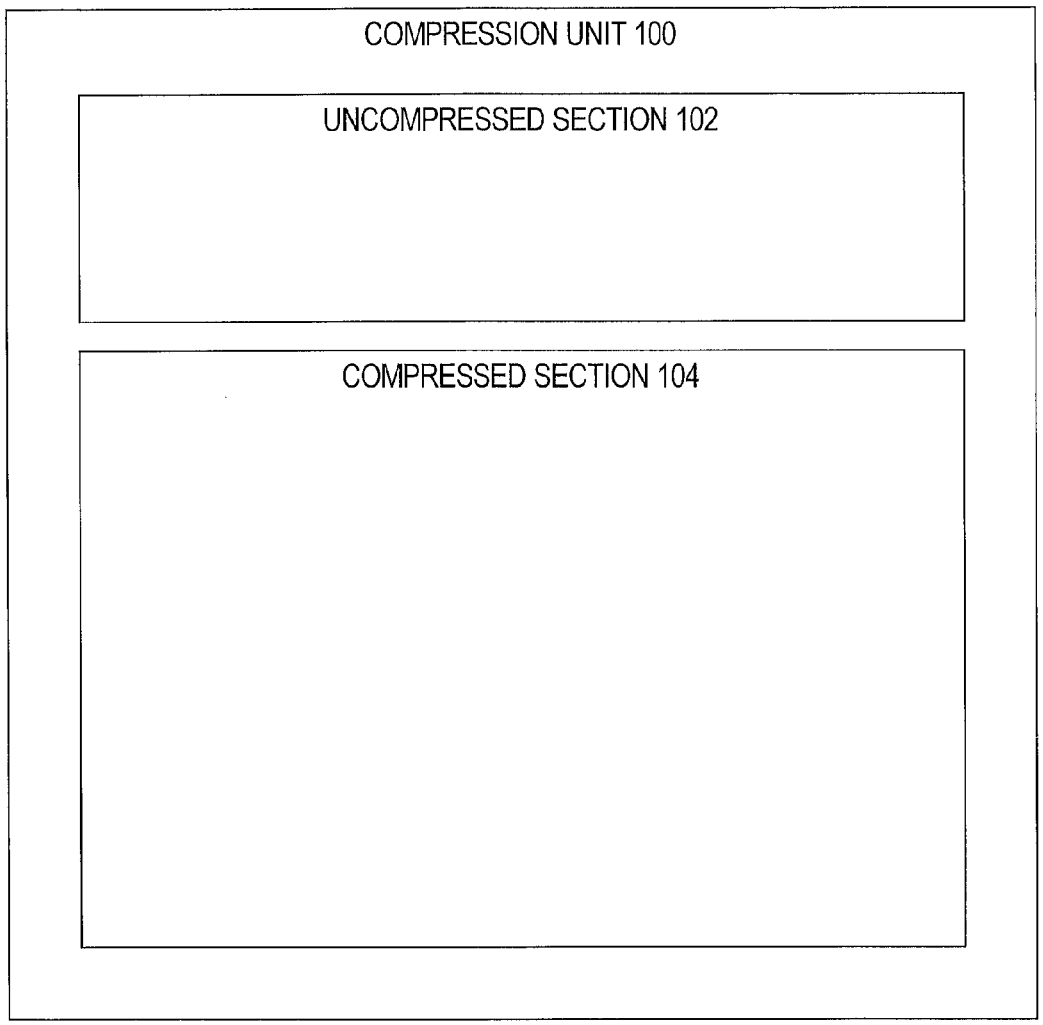
FIG. 1 is a block diagram of a compression unit, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for organizing and storing tabular data in compression units. According to one embodiment, a user may control whether tabular data is stored in row-major or column-major format. Different storage formats may be selected for data residing in the same table. Thus, tabular data from the same table may be stored in both row-major and column-major format (i.e., a hybrid format). In one embodiment, a desired compression/performance balance point is selected for each segment that is compressed. Based on the selected balance point, compression techniques will be selected to compress the tabular data to achieve an appropriate balance of query performance and data compression. Thus, tabular data from the same table may be compressed in different ways.

According to one embodiment, table segments are used to determine the optimal compression techniques to apply to tabular data within a segment. A segment, as referred to herein, is a defined portion or unit of persistent storage in a persistent store (e.g., a named file, a storage object with an associated object id) that is allocated to store data of a database object (e.g., a table, table index). One type of segment is a table partition, in which a table is divided into distinct, independent segments. A table may be partitioned and sub-partitioned according to various techniques, such as range, list, hash, and composite partitioning. By analyzing data on a per-segment basis, data correlations may more easily be determined, and better compression ratios may be achieved. In one embodiment, once the optimal compression techniques are determined for one table segment, the compression techniques are applied to all other table segments for which the user has selected the same balance point. By only analyzing one representative segment, the overhead associated with performing compression tests for each segment is avoided.

Techniques are also described hereafter for manipulating tabular data stored in a hybrid of row-major and column-major formats. According to one embodiment, techniques are employed to avoid changing tabular data within existing compression units. For example, deleting tabular data within compression units is avoided by merely tracking deletion requests, without actually deleting the data. As another example, inserting new tabular data into existing compression units is avoided by storing the new data in row-major format. If the number of deletions exceeds a threshold, and/or the number of new inserts exceeds a threshold, a compression unit may be recompressed, and logically-deleted rows that may further be physically deleted to reclaim storage. Transactions may also lock data in compression units at the level of a compression unit or at the level of a row.

According to one embodiment, rows may be migrated from column-major format to row-major format. For example, if an operation may more optimally be performed on a row stored in row-major format, then the row may be moved from a column-oriented storage section to a row-oriented storage section. In one embodiment, row stability is provided when the row is migrated. Because applications sometimes cache the old row address, if the old row address is used after the row is migrated, an error may occur. In order to avoid potential errors, the old row address may be transparently mapped to the new row address.

Compression Unit Overview

FIG. 1 is a block diagram of a compression unit 100 according to one embodiment. In the embodiment illustrated in FIG. 1, compression unit 100 has two primary sections: an uncompressed section 102 and a compressed section 104. In general, the uncompressed section 102 includes metadata about the contents and format of the compressed section 104. Uncompressed section 102 may indicate, for example, what compression technique (if any) was used to compress the contents of the compressed section 104, and how the contents of uncompressed section 102 are organized. The compression unit may be used for storing tabular data according to techniques described in STRUCTURE OF HIERARCHICAL COMPRESSED DATA STRUCTURE FOR TABULAR DATA.

Figure 2:
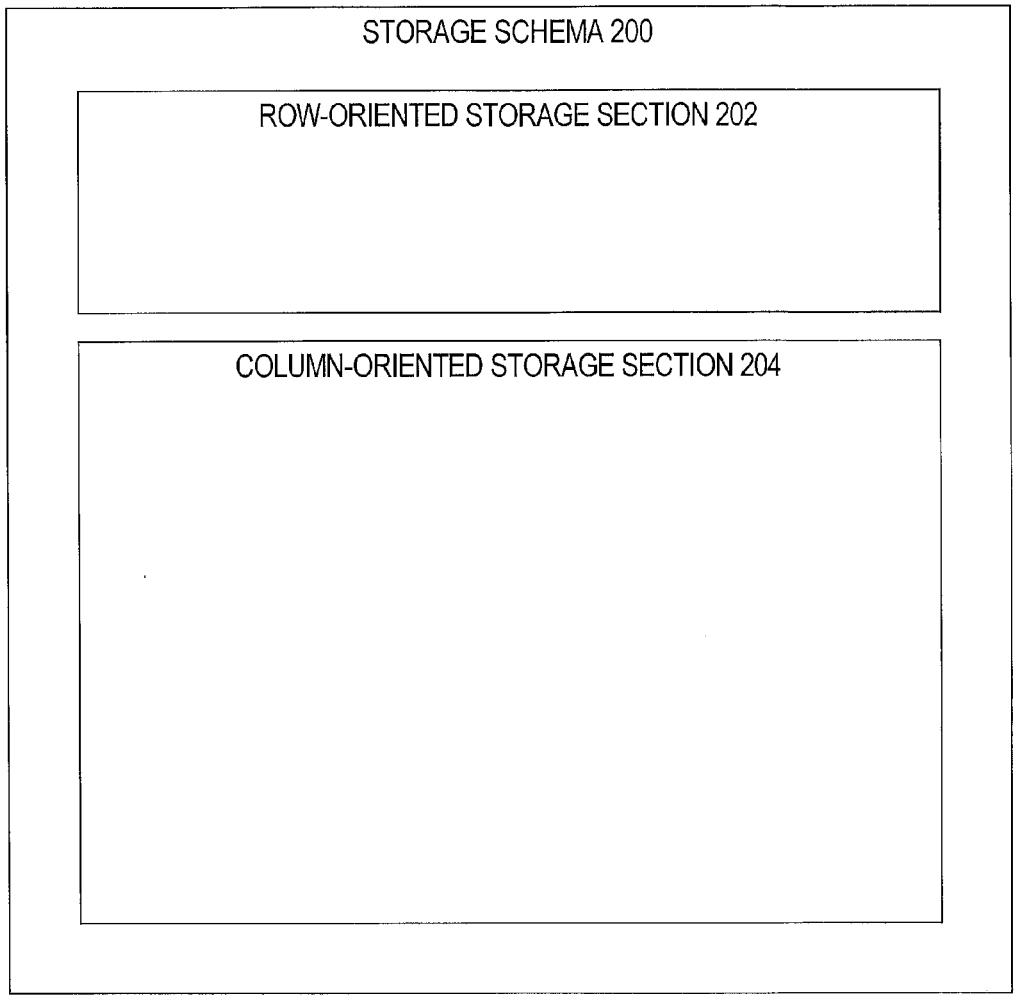
FIG. 2 is a block diagram of a storage schema for storing tabular data, according to an embodiment of the invention.

FIG. 2 shows a block diagram of a storage schema 200 for storing tabular data according to one embodiment. In the embodiment, the two primary sections are a row-oriented storage section 202 in which data is stored in row-major format and a column-oriented storage section 204 for data stored in column-major format. The data in row-major format may be uncompressed or compressed using row-compression techniques, such as OLTP compression as described in U.S. patent application Ser. No. 11/875,642 entitled "ON-LINE TRANSACTION PROCESSING (OLTP) COMPRESSION AND RE-COMPRESSION OF DATABASE DATA" filed on Oct. 19, 2007. The data in the row-oriented storage section 202 includes a first set of rows from a table or table segment. Data from the row-oriented section 202 is stored in one or more disk blocks according to various techniques for storing data in row-major format, as discussed in STORING COMPRESSION UNITS IN RELATIONAL TABLES.

The column-oriented storage section 204 includes a second set of rows from the table segment. In general, the data in column-oriented storage section 204 will be compressed according to techniques for compressing columns or column groups, such as the techniques described in COMPRESSION ANALYZER. In one embodiment, the column-oriented storage section 204 comprises one or more compression units, with each compression unit corresponding to one or more columns for the second set of rows. Each of the compression units may also have children, as described in STRUCTURE OF HIERARCHICAL COMPRESSED DATA STRUCTURE FOR TABULAR DATA. The data may also be stored uncompressed in column-major format. Data from the column-oriented storage section 204 is stored in one or more disk blocks according to techniques for storing compression units in disk blocks, as described in STORING COMPRESSION UNITS IN RELATIONAL TABLES. According to an embodiment, the tabular data stored in column-oriented storage section 204 is stored in disk blocks in column-major format.

Metadata is maintained to indicate how the storage schema and each compression unit in the storage schema is organized. Depending on the implementation, the metadata about the organization of tabular data within the storage schema 200 may be stored external to the storage schema 200, within the storage schema 200, within the row-oriented storage section, 202, within the column-oriented storage section 204, or within compression units in the column-oriented storage section 204. Furthermore, the metadata may be divided amongst the different sections. The actual manner in which the metadata is stored may vary from implementation to implementation.

According to one embodiment, compression unit metadata that describes the organization of the data is maintained within column-oriented storage section 204. The compression unit metadata maintained about the column-oriented storage section 204 includes compression unit metadata 600, shown in FIG. 6. The compression unit metadata may be maintained by a database server. It should be understood that the embodiment illustrated in FIG. 6 is merely one example of how the compression unit metadata 600 may be organized, and the types of metadata that may be maintained.

Figure 6:
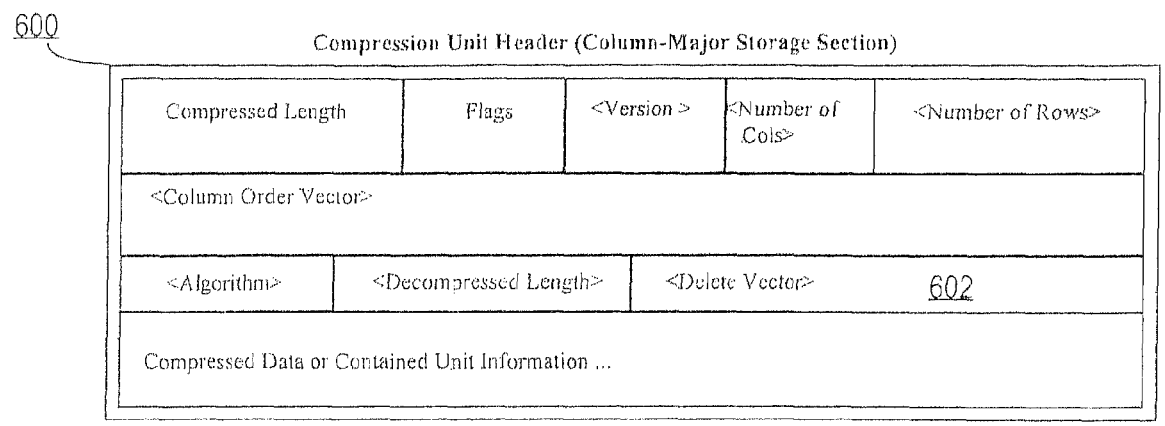
FIG. 6 is a block diagram illustrating metadata to indicate how tabular data that has been organized and stored in column-major format.

In the embodiment illustrated in FIG. 6, compression unit metadata 600 comprises the compressed length, a flags field, a version field, the number of columns and rows, a column order vector, an algorithm field, a decompressed length field, delete vector 602, and a compressed data field. Each metadata field is described in greater detail in STRUCTURE OF HIERARCHICAL COMPRESSED DATA STRUCTURE FOR TABULAR DATA.

In one embodiment, compression unit metadata 600 is maintained in a parent level compression unit stored in column-oriented storage section 204. The parent or top-level compression units contains a set of rows, which are stored in column-major format. Each column or column group within the compression unit may be divided into smaller child or lower-level compression units.

Creating Compression Units

Figure 3A:
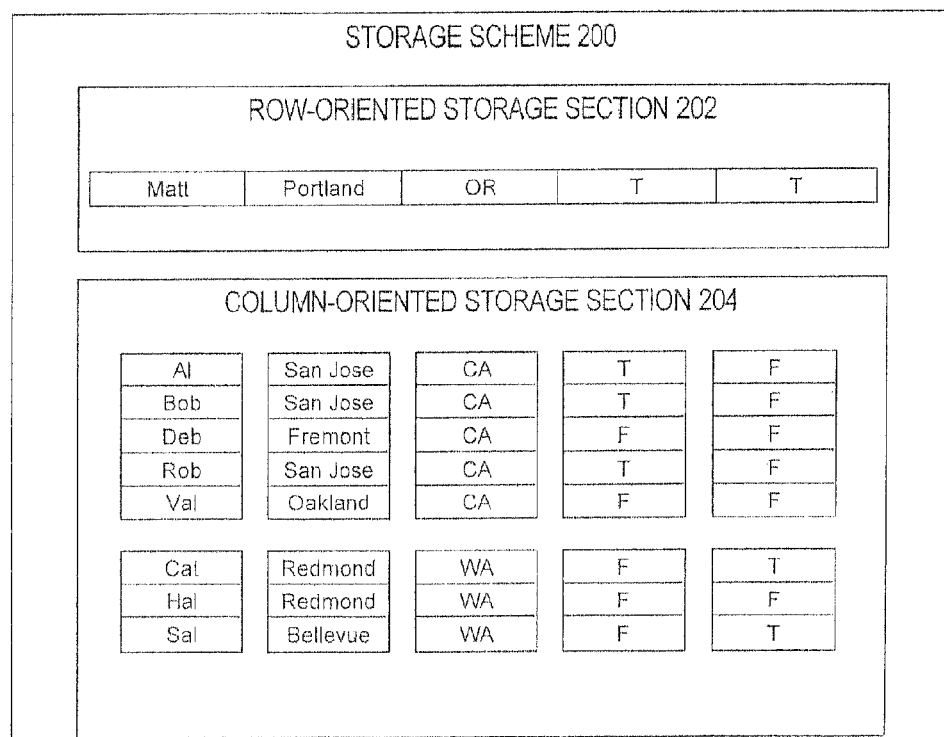
FIG. 3A is a block diagram illustrating how column-major storage may be enabled at the level of a partition, according to an embodiment of the invention.

According to one embodiment, compression units can be defined at the level of a segment. FIG. 3A is a block diagram illustrating how compression units based on partitions may be created according to an embodiment. Table 300 consists of a plurality of records corresponding to rows 308-324. Each record in the table has a plurality of attributes, corresponding to columns 326-334 including attributes for the city (column 328) and state (column 330) in which the person resides. In the illustrated embodiment, table 300 is partitioned on the state column (column 330). Partitioning on the state column results in three subtables: one containing records of people residing in California (partition 302), one containing records of people residing in Washington (partition 304) and one containing records of people residing in Oregon (partition 306). For purposes of illustration, only one level of partitioning is shown. However, multiple levels of partitioning are possible. For example, each table may be subpartioned based on the city column. Also, for facilitating illustration, table 300 shows a limited number of records. However, it should be understood that table 300 may contain millions of records from multiple states, resulting in a greater number of partitions.

In one embodiment, compression of a table is controlled at the level of a segment. For example, for a particular segment, such as partitions 302, 304, or 306, a user selects whether to enable hybrid columnar compression for the particular segment. If enabled, then data loaded into the segment is compressed into a compression unit in column-major format according to techniques summarized above and described in cross-referenced applications. If compression is not enabled, then the data from the segment remains in row-major format, either uncompressed or compressed according to row-compression techniques, such as OLTP or Basic compression. Referring to FIG. 3, a user may enable compression for any combination of segments 302-306. For example, a user might enable compression for segment 302 and 304, but not segment 306. As a result, tabular data for segments 302 and 304 would be stored in column-oriented storage section 204, and tabular data for segment 306 would be stored in row-oriented section 202. It should be understood that the columns shown FIG. 3A in column-oriented-storage section 204 may be stored in a variety of ways according to the techniques described in the cross-referenced applications. According to one embodiment, each segment for which hybrid columnar compression is enabled has its own top-level compression unit. Each column of a segment may be divided between one or more bottom-level compression units. Alternatively, segments with the same compression-level may share the same top-level compression unit. Also, the set of rows and/or each column may be sorted in a different order than shown in FIG. 3A before being compressed and stored in column-major format. Sorting techniques are discussed further in COMPRESSION ANALYZER.

In one embodiment, the level of compression is controlled at the level of a segment. For example, for each segment, a user may select a balance point, as described in COMPRESSION ANALYZER. The selected balance point determines the compression techniques that will be applied to the particular segment. At one end of the spectrum, compression will be maximized. At the other end of the spectrum, query performance will be optimized. Continuing with the preceding example, if a user has enabled hybrid columnar compression for both partitions 302 and 304, the user may select the same or different levels of compression for each partition. Based on which balance point is selected, data will be analyzed and compressed according to the techniques described in COMPRESSION ANALYZER. In one embodiment and as described further below, for a particular compression-level, only data for one, representative partition is analyzed. Other partitions with the same compression-level are compressed based on the analysis of the representative partition.

Thus, the storage format of tabular data (i.e. column-major format, row-major format) and the compression techniques applied to the tabular data may vary from partition to partition. In alternative embodiments, compression is enabled/disabled on a per-table, per-column, or column-group basis. For example, a user may simply enable hybrid columnar compression for the entire table 300 instead of enabling compression for each particular segment of a table.

In another embodiment, the compression-level is selected on a per-table, per-column, or column-group basis. For example, a user may select a particular balance point for one column, such as column 328, and select a different balance point for another column, such as column 330. Thus, the compression techniques applied to column 328 would be different than the techniques applied to column 330.

In one embodiment, enabling compression and selecting a compression-level for a table segment is done through Data Definition Language (DDL) commands. For example, a user may create a table using a CREATE TABLE statement, partition the table using a PARTITION BY statement, and enable and define the compression-level using a COMPRESS FOR [SELECTED COMPRESSION-LEVEL] statement. Alternatively, a command line prompt, graphical user interface, or other means for receiving user input may be used to allow users to define compression units and compression-levels. Further examples are provided in COMPRESSION ANALYZER.

Thus, a user, such as a DBA or application external to a database server, may define a storage schema to store tabular data to optimize query performance and maximize data compression. At the table or segment level, the user may specify which tabular data should be stored in rows or columns. Furthermore, the user may select different compression-levels by specifying a balance point between query performance and increased compression. Thus, if a particular segment of data will be infrequently updated or accessed, a user may prefer to maximize compression. Conversely, if the user expects frequent updates to a segment, the user may prefer to shift the balance point toward query performance or to store the segment entirely in row-major format.

According to one embodiment, the database server creates metadata for each table segment to indicate whether the segment is stored in row-major or column-major format. Also, the database server may create metadata to indicate the compression-level and/or compression techniques applied for each compressed segment. In one embodiment, the metadata is stored in the header of one or more of the data blocks in which a table segment is stored. The metadata may be examined by the database server in order to determine the storage format for rows in a particular segment and how to store rows subsequently loaded into the segment.

Figure 4:
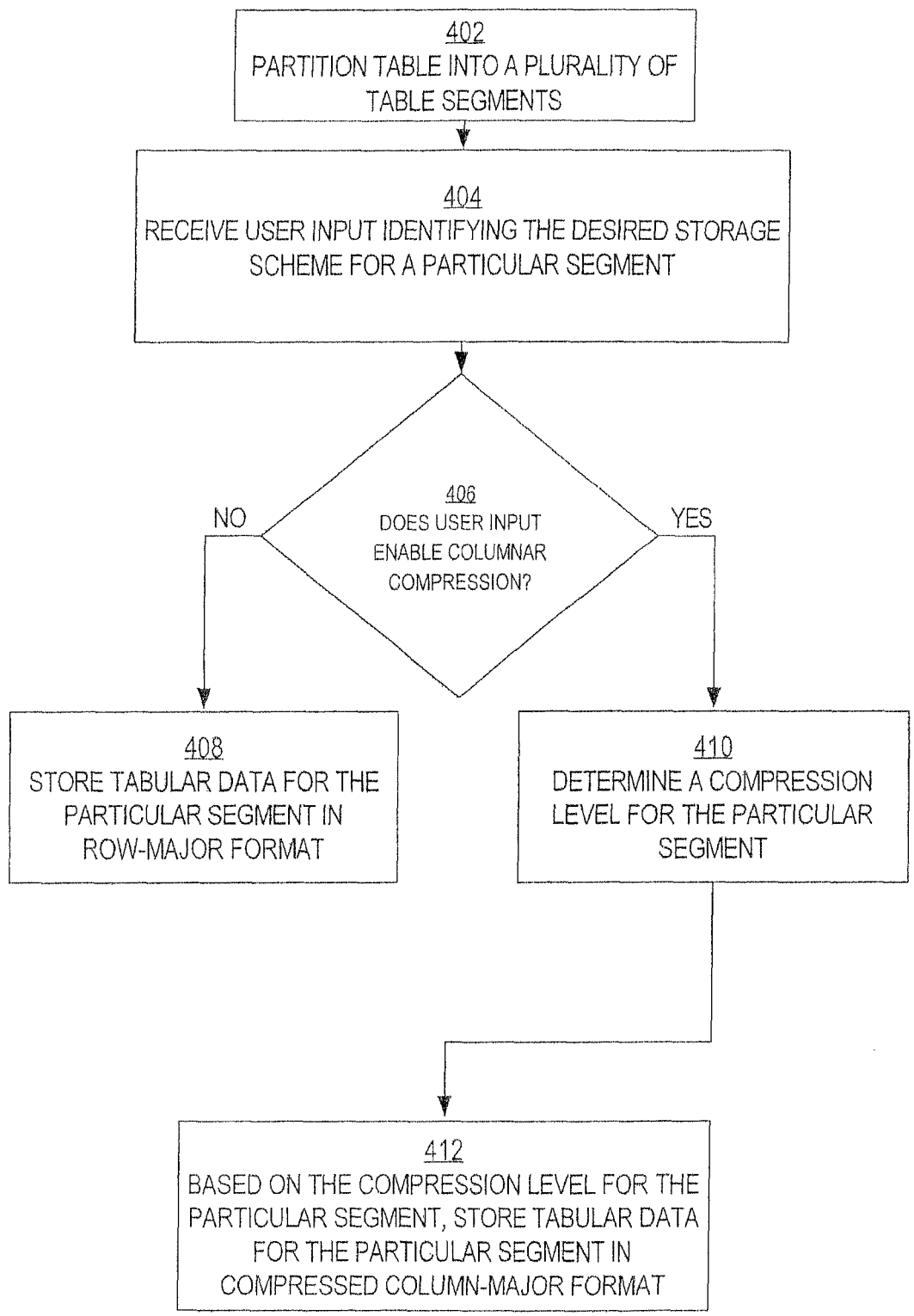
FIG. 4 is a flowchart illustrating steps for defining a storage schema at a segment level according to one embodiment.

FIG. 4 is a flowchart illustrating steps for defining a storage schema at a segment level according to one embodiment. In step 402, a table is partitioned into a plurality of table segments. As noted above, this may be done through various partitioning techniques. In step 404, user input is received that identifies the desired storage schema for a particular segment. It should be understood that a plurality of segments may also be concurrently selected. Also, as noted above, compression may be enabled on a per-table, per-column, or per-column group basis. In step 406, it is determined, for example by a database server, whether the user input enables columnar compression. If the user does not enable columnar compression, tabular data for the particular segment is stored in row-major format (step 408). If the user enables columnar compression, then a compression-level for the particular segment is determined (step 410), and tabular data for the particular segment is stored in compressed column-major format based on the determined compression-level for the particular segment (step 412). In one embodiment, explicit input is only received for enabling columnar compression. If a user creates a partition but does not enable compression or otherwise provide input identifying the desired storage schema, the segment will be stored in row-major format by default. Alternatively, the default may be to hybrid columnar compress the segment unless the user explicitly requests the segment be stored in row-major format. Furthermore, as noted above, determining a compression-level for the particular segment may be based on a user-selected balance point. If the user does not select a balance point, a default compression-level may be selected.

The storage schema may also be modified throughout the life of the data. In general, as data age, the usage pattern for the data will change. For example, accesses and updates to the data may become more infrequent. Thus, the compression-level for the table or table segment containing the data may be changed in order to achieve better compression ratios. For instance, a user may change the previously selected balance point to shift the balance toward compression. As a result, the data will be reanalyzed and recompressed to more tightly compress the data. Thus, each individual table segment may have its own Information Lifecycle Management (ILM) story, such as getting compressed tighter and tighter, as its usage pattern changes.

Loading Data into Compression Units/Creating Map

Once the compression-levels have been defined according to the embodiments described above, data may be bulk loaded into one or more tables segments according to the defined storage schema. Alternatively, if the compression is not explicitly enabled/disabled or the balance point is not explicitly selected by a user, a default level of compression may be automatically selected to provide an optimal balance between performance and storage. The data may be analyzed, compressed, and loaded into compression units according to the techniques described in COMPRESSION ANALYZER.

According to one embodiment, rows are analyzed across partitions. As discussed in COMPRESSION ANALYZER, the compression of data is based, in part, on the cardinality of data of the rows being analyzed. However, when considering tabular data in aggregate, the cardinality of the data may be vastly different from the cardinality of data in a particular partition. Furthermore, the cardinality or distribution of data on a non-partitioned column may have hidden correlations that are not readily apparent from a set of sample rows from the aggregate data. Therefore, the ideal way to compress a column may differ when viewed within a single partition versus when viewed in aggregate. For example, assume that table 300 included one million rows in addition to rows 308-324. By loading a subset of table 300, such as the first ten thousand rows, the compression analyzer will determine which compression techniques to apply for each column. However, the uniqueness of the data in each column differs from when the table is partitioned by state. Referring to partitions 302, a correlation between state and column 334 becomes apparent because the cardinality of data column 334 decreases once partitioned. Therefore, the compression analyzer may use these correlations to select compression techniques to achieve better compression ratios. Accordingly, instead of analyzing a subset of the tabular data in aggregate, tabular data may first be split into partitions.

Thus, in one embodiment, data is analyzed and compressed on a per-partition basis. In response to a load operation to bulk load data into a table, for each compression-level, a set of sample rows from a table segment is selected to analyze. In one embodiment, the set of sample rows are rows that have been buffered in memory in response to the load operation. Once a sufficient number of rows to analyze have been buffered, the compression analyzer analyzes the columns to determine which compression techniques to apply, compresses the data for the partition, and writes the compressed data to one or more disk blocks. The number of sampled rows from a partition may vary from embodiment to embodiment. For example, one embodiment may select all of the rows to-be-loaded for the partition as the sample. However, the larger the set of sample rows, the longer it takes to perform compression tests against the sample rows, and the greater the amount computational resources required and consumed by those tests. Therefore, other embodiments may cap the number of rows selected as the sample. The cap may be based on a percentage of the rows to-be-loaded into the partition. The cap may also be based on a specific maximum number of samples, or the amount of resources, such as dynamic memory, that is available on the system on which the tests are to be performed.

Figure 5:
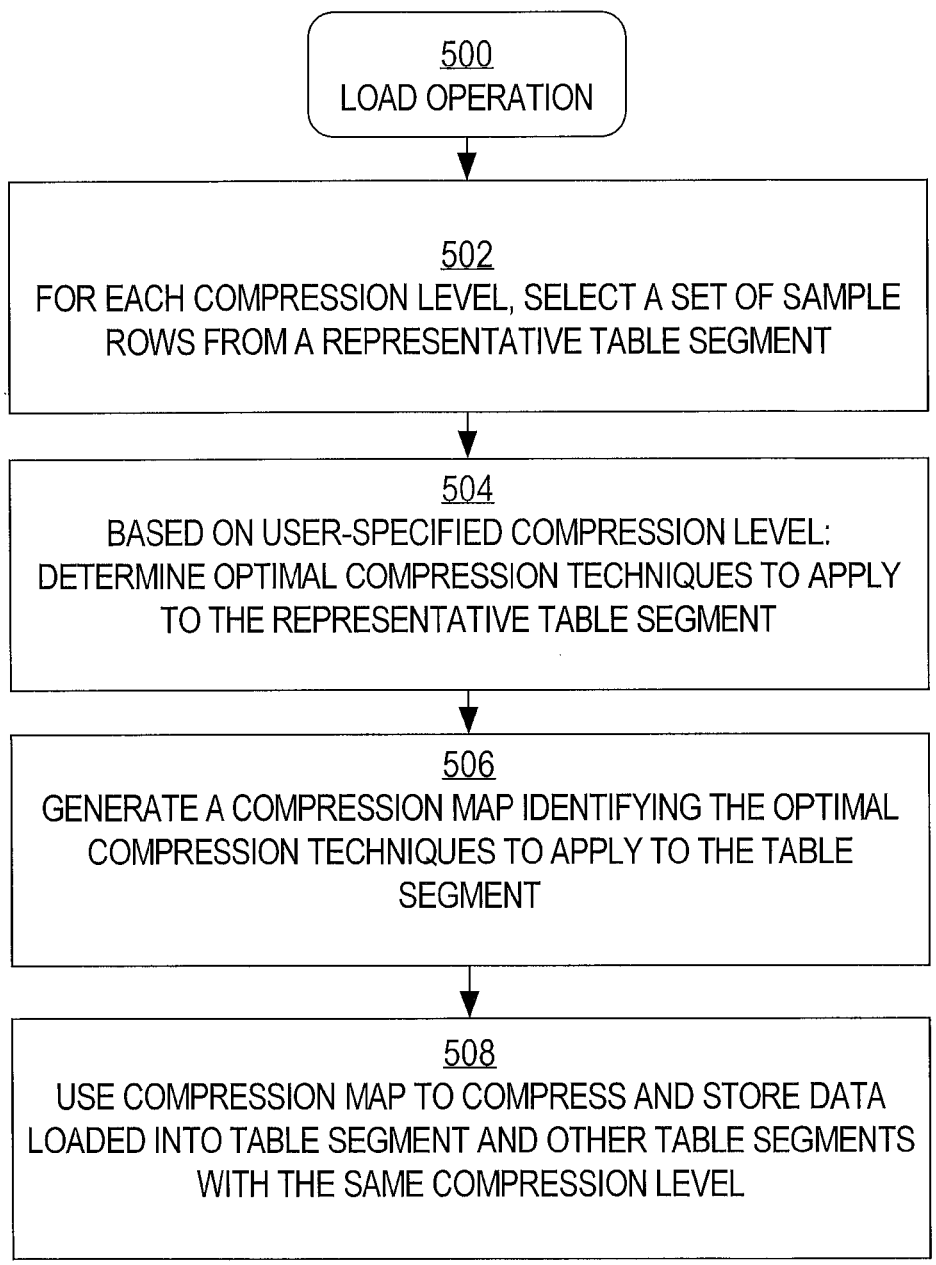
FIG. 5 is a flowchart illustrating steps for analyzing, compressing, and loading data into compression units based on a representative table segment.

In one embodiment, data are analyzed and compressed for each partition. However, as noted above, performing compression tests for a large subset of data may consume a great amount of computational resources. Therefore, according to an alternative embodiment, only one representative partition is analyzed for a given compression-level. FIG. 5 is a flowchart illustrating steps for analyzing, compressing, and loading data into compression units based on representative table segments. In step 502, for each compression-level, a set of sample rows from a representative table segment is selected to analyze. For instance, a table may include 15 partitions. The user may have selected one compression-level for the first four partitions, a second compression-level for the next six partitions, and a third balance point for the final five partitions. Thus, a set of sample rows will be selected for three representative partitions, one for partitions compressed according to the first compression-level, one for partitions compressed according to the second compression-level, and one for partitions compressed according to the third compression-level.

In an embodiment, data from table segments may be loaded in parallel and/or in non-sequential order. Therefore, according to one embodiment, the compression analyzer monitors the incoming rows and selects a representative partition based on the first partition that has a sufficient sample of rows to be analyzed, which may be determined according to the criteria specified above.

Once the compression analyzer determines that enough data has been buffered in memory for a particular partition, loading temporarily stops. In step 504, based on the user-specified compression-level and the data stored in the set of sample rows, the compression analyzer determines the optimal compression techniques to apply to the representative table segment. Then, the compression analyzer may analyze each column in the set of sample rows and perform compression tests to determine which compression techniques are optimal for the representative table segment. Methods for determining optimal compression techniques based on compression-levels and compression testing are further discussed in COMPRESSION ANALYZER.

In step 506, the compression analyzer generates a compression map, which identifies the optimal compression techniques as compression parameters to apply to the representative table segment. For example, the compression parameters may specify the sort order of the rows and/or columns for the segment and the compression sequences to apply to a particular column in the segment. The compression map is stored in a dictionary table associated with that segment (or partition). The map is stored with data that associates the map with the table segment, so that a database server will be able to account for the compression during subsequent accesses to the segment.

Once the compression map is generated, the map is released to all nodes responsible for loading data, and the process of loading continues. In step 508, the compression map is used to compress all other table segments that have the same specified compression-level (e.g., partitions for which the user has selected the same balance point.) The process is performed for each specified compression-level. Thus, compression analyzer generates a map for each specified compression-level based on one representative partition for the compression-level. By analyzing only one representative partition per compression-level, the computational resources required to buffer the data and perform compression tests is greatly reduced.

The techniques described above may be performed on partitions that are empty or partitions in which data already exists. If data already exists in the partition, the data may either be left as is or it may be compressed according to the above-techniques. For example, if the DBA does not wish to columnar-compress the preexisting data in the partition, then the data remains in row-major format. However, all subsequent data loaded into the partition may be analyzed, compressed, and stored in one or more compression units in column-major format. If the DBA wants to compress the preexisting data, the database server may create a temporary segment, read the preexisting data into the temporary segment, and then reload the data into the segment according to the techniques described above.

In one embodiment, the compression map is further used to compress all subsequent data that is bulk loaded into a partition associated with the map. If, at anytime, the compression ratios for a particular partition are unsatisfactory, the partition may be individually reanalyzed and a new compression map generated for the particular partition. The data residing in the partition may be reloaded and recompressed according to the newly generated map.

Drop Column

According to one embodiment, a delete vector is used to delete columns from a table without actually deleting, from persistent storage, the data that the columns contain. Thus, when a drop column command is received, the column is only logically dropped from the table. For example, storage schema metadata may include a bit vector for all the columns for a particular table or table segment. In one embodiment, the bit vector has one bit for each column, corresponding to the column's logical location in the table or table segment. In response to receiving the drop column command, the bit vector is marked to indicate that the column is unused. The column is not physically removed from the disk block at that time.

By only logically dropping the column, a drop column command does not incur the overhead associated with physically deleting the column for each row of a set of rows, some of which may be stored in row-major format and others in column-major format. When a column is logically dropped, data in the column is still retained in the compression units (i.e., it still physically resides on disk). However, subsequent queries are processed as if the column is not defined for the table. Consequently, end users may not validly reference the column in queries and statements.

DML Operations

Figure 7:
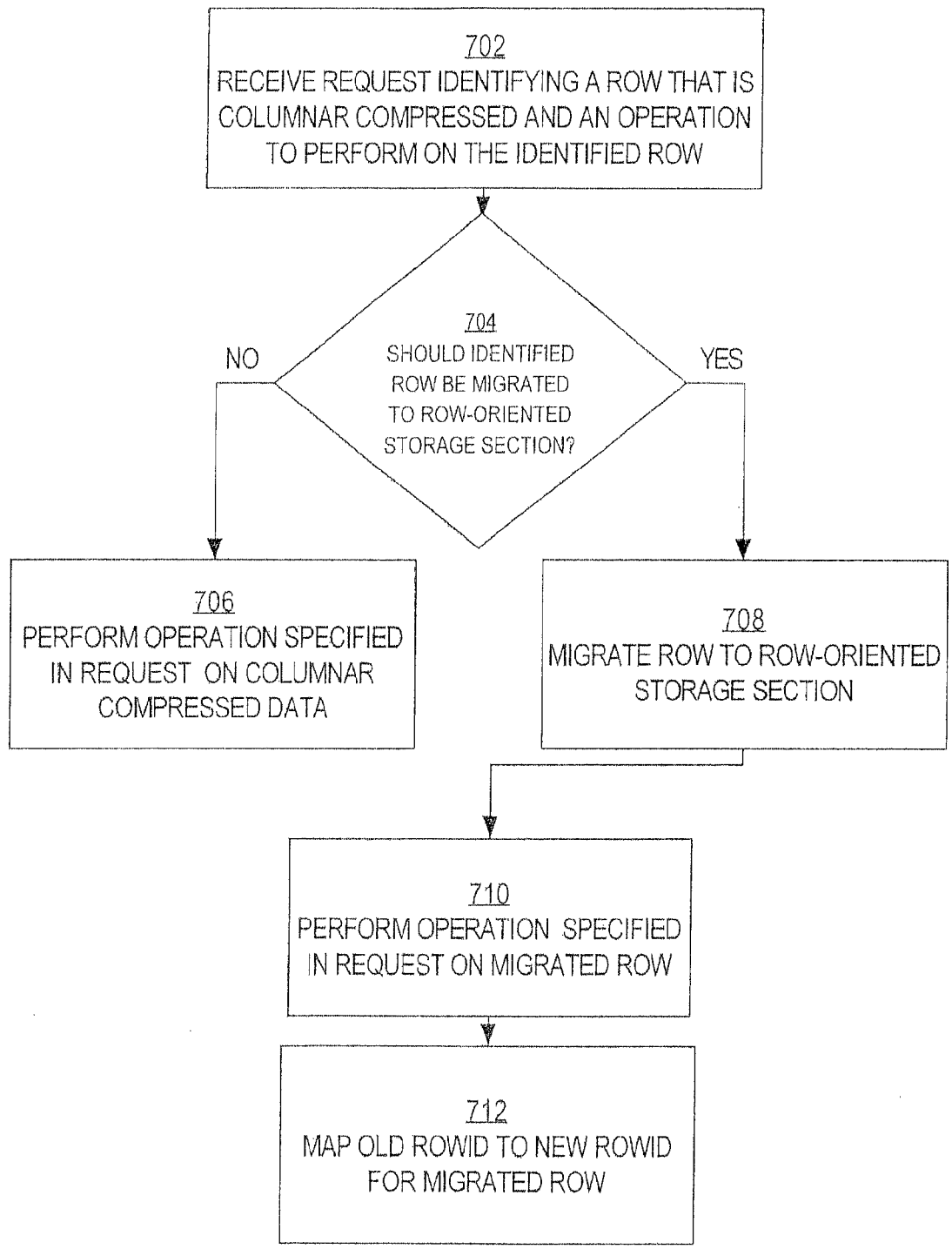
FIG. 7 is a flowchart illustrating steps for manipulating tabular data that is stored in both row-major and column-major format, according to an embodiment of the invention.

FIG. 7 is a flowchart illustrating steps for manipulating tabular data that is stored in both row-major and column-major format, according to an embodiment of the invention. In step 702, a request is received which identifies a row that is columnar-compressed and an operation to perform on the identified row. In one embodiment, the operation is a data manipulation event that modifies or otherwise manipulates tabular data. For instance, the request may be a DML command, such as a DELETE or an UPDATE. Furthermore, the request may be made in association with a DML statement, such as a request by a transaction to lock a row.

In step 704, it is determined, whether identified row should be migrated to row-oriented storage. The determination may vary from implementation to implementation. In one embodiment, the determination may be based on the type of request received. Certain types of requests, such as inserts, updates and lock requests, may cause a row to be stored in row-major format. By migrating rows between row-major and column-major formats, the benefits of each may be realized. For example, certain operations may be performed more efficiently on data stored in row-major format (e.g., with less reads or writes to disk). Also, certain operations may prevent a columnar-compressed row from recompressing into the same space on disk. In such scenarios, an event may cause the row to migrate to row-oriented storage. On the other hand, storing tabular data in column-major format generally achieves greater compression ratios, because runs of data are generally more common in columns than rows. Thus, if an operation can be performed on columnar-compressed data without decompressing the data, the row may remain in columnar-compressed format. As described further below, in certain embodiments, metadata maintained by a database server may prevent the need to decompress columnar-compressed data. Thus, the determination of whether a row should be migrated to row-major format may be dependent on such metadata. According to one embodiment, if a delete vector in column-oriented storage section 204 indicates that a threshold number of rows have been deleted from a compression unit, then the one or more compression units containing the row may be recompressed after the operation is performed on the row. Once a threshold number of rows have been deleted, it is much more likely that the compression unit may recompress into the same space. Thus, if a threshold number of rows have been deleted, the identified row is not migrated to row-oriented storage.

If it is determined (e.g., by a database system in response to the request), that the identified row should not be migrated to row-oriented storage, then in step 706, the operation specified in the request is performed on the columnar-compressed data.

If the operation can more efficiently be performed on data stored in row-major format, then in step 708, the row is migrated to the row-oriented storage section. In one embodiment, if the row has previously been stored in column-major format, then the row is not physically deleted from column-oriented storage section 204 when the row is migrated. Instead, the row is marked as deleted in metadata stored for column-oriented storage section 204, and a corresponding row is added to row-oriented storage section 202. In this manner, the operation may be performed more efficiently by avoiding decompressing and recompressing compression units. The storage space may be reclaimed by physically deleting the row from column-oriented storage upon subsequent request by a user or upon a delete vector exceeding a threshold. Alternatively, step 708 may comprise decompressing the compression unit, physically deleting the row, and recompressing the compression unit without the row to immediately reclaim storage.

In step 710, the operation specified in the request is performed on the migrated row. For example, data within the migrated row may be accessed, updated, deleted, or otherwise manipulated.

Because the row has migrated to a new location, the previous rowid used to identify the old location of the row within a compression unit may no longer identify the correct row. Therefore, in step 712, the previous rowid of a migrated row is mapped to a new rowid. In one embodiment, this involves generating mapping data to map the previous rowid to the new rowid. If subsequent queries identify a row using the previous rowid, the database server may use the mapping data to determine the new rowid and locate the correct row in persistent storage.

Deleting Tabular Data Stored in Compression Units

In one embodiment, the delete vector in delete vector field 602 (illustrated in FIG. 6) is used to delete rows from a table without actually deleting, from the compression unit, the data that the rows contain. For example, assume that a particular compression unit stores data for 1000 rows. The corresponding delete vector may include 1000 bits, where the position of the bit indicates the row to which the bit corresponds. If a request is received to delete the $10^{th}$ row from the compression unit, then the $10^{th}$ bit of the delete vector is set to indicate that the corresponding row is deleted. However, the actual data for the $10^{th}$ row is not actually deleted from the compression unit and still physically remains on one or more disk blocks.

Various benefits result from treating deletions in this manner. For example, by using the delete vector, deletions do not incur the overhead associated with decompressing the compressed section of a compression unit (and any lower-level compression units contained therein), because the delete vector is in the uncompressed section of the compression unit.

Further, the decompression overhead is not the only overhead avoided by using the delete vector. Specifically, if the compressed section were decompressed to remove the deleted row, then the compressed section would have to be recompressed after the row data was removed, thereby incurring more overhead. In addition, deletion of data from a compressed set of data may, under some circumstances, increase the compressed size of the data.

In one embodiment, rather than include a delete vector in the header of all compression units, the delete vector is only included at the top-level compression units. Inspection of the top-level delete vector indicates which rows have been deleted without having to access the headers of any lower-level compression units.

As noted above, the delete vector may only indicate that a row has been logically deleted. According to one embodiment, if the delete vector indicates that all rows from a compression unit have been deleted, then the entire compression unit is both logically and physically deleted.

According to one embodiment, if the number of rows that are deleted exceeds a particular threshold, then the entire compression unit is rewritten and/or recompressed. For example, if the bit vector indicates that more than some threshold percentage of the rows within a compression unit has been deleted, the compression unit may be decompressed, and the not-yet-deleted rows may be stored in a new compression unit. If there are sufficiently few rows remaining the system may store the compression unit in uncompressed form to avoid further overhead associated with decompressing the compression unit. Alternatively, during this process, the data from many compression units may be combined into a new, smaller set of compression units which may be compressed.

Inserting Tabular Data

According to one embodiment, the insertion of data into a hybrid columnar-compressed compression unit may be done directly. However, the addition of data into a hybrid columnar-compressed compression unit could incur significant overhead penalties, due to the decompression and recompression that would be required. Further, the resulting compression unit may be larger than desired and may not recompress into the same space. In the case that the compression unit contains data in uncompressed form, and the block contains sufficient space, the data may be updated directly without such overhead. However, for data stored purely in column-major format, an insert could incur significant write-to-disk costs because the disk blocks containing the columns for the updated row need to be updated.

Figure 3B:
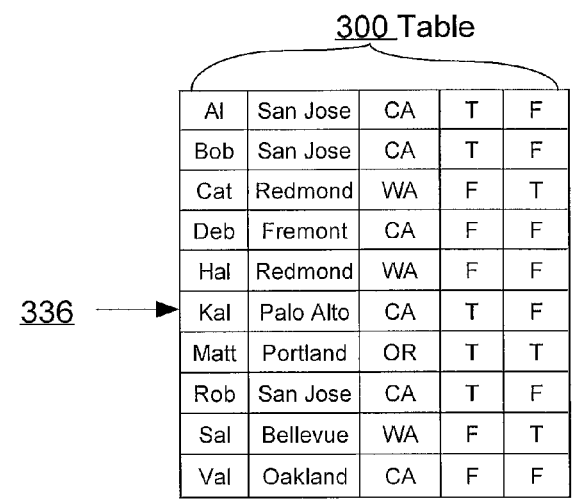
FIG. 3B is a block diagram illustrating an example embodiment of a row insert for tabular data that is stored in both row-major and column-major format.
Figure 3B:
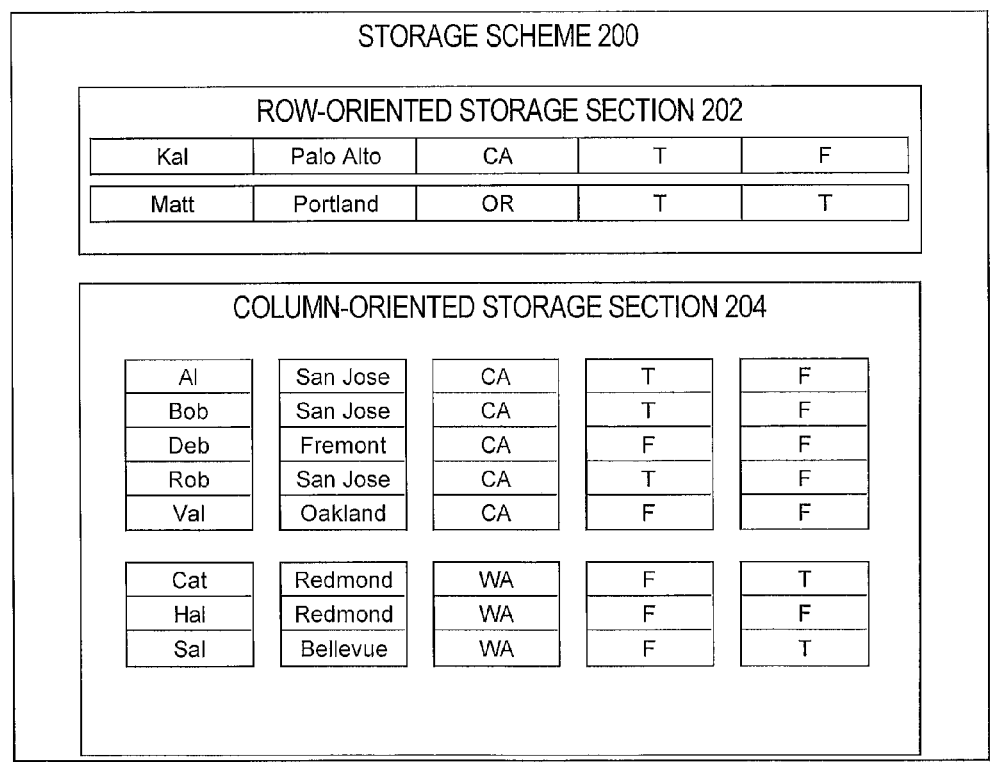

Thus, according to one embodiment, newly added tabular data is not inserted into existing compression units in column-oriented storage section 204. FIG. 3B is a block diagram illustrating an example embodiment of a row insert for tabular data that is stored in both row-major and column-major format. In response to a request to insert row 336 into table 300, the row is stored in row-oriented storage section 202. It should be noted that although a user may have initially enabled columnar compression for a particular segment, due to certain events, such as receiving an INSERT statement, rows for a particular segment may be spread between row-oriented storage section 202 and column-oriented storage section 204. By inserting the row into row-oriented storage section 202, the overhead associated with decompressing and recompressing columnar-compressed data and updating each column of a table segment, which may be spread out over several disk blocks, may be avoided.

In one embodiment, if the delete vector for column-oriented storage section indicates that a threshold number of rows that were previously columnar compressed have been deleted, then the inserted row may be added to column-oriented storage section, and the rows in that section may be recompressed. Although some of the costs discussed above may be incurred, reclaiming the storage space may be worth occasionally recompressing the columnar-compressed data. Furthermore, according to this embodiment, the costs discussed above are still reduced because they are not incurred upon every insert performed.

In one embodiment, when the amount of data to be inserted into table 200 exceeds a threshold, then the data is not stored in the row-major storage area. Rather, the new data is stored in new compression units. For example, if a bulk load operation is performed to add thousands of rows to table 200, then one or more new compression units may be created to store the tabular data for the new rows. According to one embodiment, the new compression units would automatically inherit the same internal structure as preexisting compression units in column-oriented storage section 204, including the structure and organization of the compression units that descend from the compression unit. Also, the new compression units may be compressed according to compression maps stored in dictionary tables for the particular segment.

Updating Tabular Data

According to one embodiment, data may be updated directly within a compression unit. However, the addition of data into a compression unit could incur significant overhead penalties, due to the decompression and recompression that would be required. Further, the resulting compression unit may be larger than desired and may fail to recompress back into the same space after the update. In the case that the compression unit contains data in uncompressed form, and the block contains sufficient space, the data may be updated directly without such overhead.

Figure 3C:
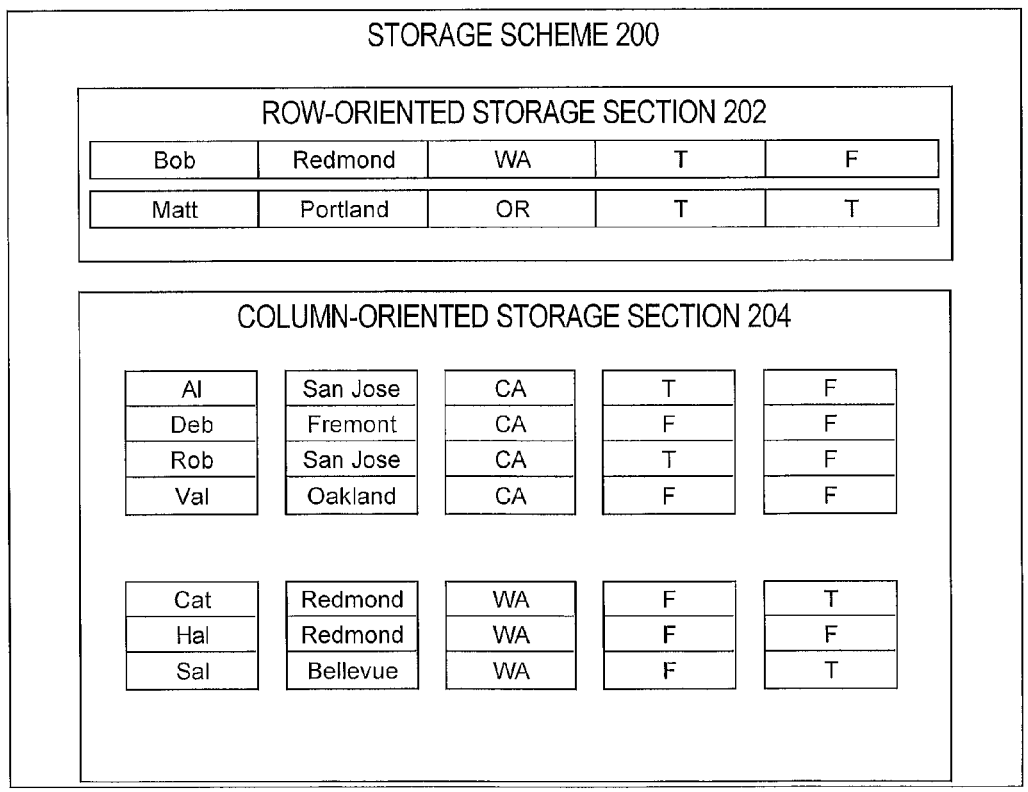
FIG. 3C illustrates an example embodiment of an update of a row stored in column-major format where tabular data is stored in both row-major and column-major format.

According to one embodiment, updates are treated as deletions combined with inserts. Thus, when a value is updated in a row of table 200, the delete vector in column-oriented storage section 204 is updated to indicate that the row is deleted, and a row with the updated values is stored in row-major storage area 202. FIG. 3C illustrates an example embodiment of an update of a row stored in column-major format where tabular data is stored in both row-major and column-major format. In response to a request to update record 310 to change the city and state where Bob resides, row 310 is migrated to row-oriented storage section 202. Although row 310 is not shown in column-oriented storage section 204, according to an embodiment, the row is only logically deleted from this section. However, the row may still physically reside in the column-oriented section data blocks.

Frequently, there will be some columns of an updated row that are not changed by an update operation. Consequently, prior to storing the updated row in row-major storage section 202, the compressed section of the compression unit (and any child compression units) may have to be decompressed to recover the pre-update values of the row. The new row stored in row-major storage area 202 includes the pre-update values of the columns of the row that were not changed, and new values for the columns of the row that were changed.

In one embodiment, if the delete vector for column-oriented storage section indicates that a threshold number of rows that were previously columnar compressed have been deleted, the row may be updated "in place" (i.e., without migrating the row to row-oriented storage). Accordingly, the one or more compression units for the row are decompressed, updated, and recompressed.

Row Stability

In one embodiment, when a row is migrated from column-oriented storage section 204 to row-oriented storage section 202, the rowid (or row address) changes to indicate the new location of the row. In certain scenarios, applications or LOB locators may cache the old rowid for the row. However, the row may be relocated from column-major storage section 204 to row-major storage section 202 without the application updating or invalidating its cached rowid. Thus, if an application or LOB locator tries to retrieve a row using the old rowid, an error will occur unless the old rowid is mapped to the new rowid.

Thus, in step 712, the old rowid is mapped to the new rowid when a row is migrated. For example, if a rowid with row R1, stored in column-oriented storage section 204 is updated, then the row is migrated to row-oriented storage section 202 in uncompressed or row-compressed format. Due to the new location, the rowid may change from R1 to R5. Rowid R1 is mapped to R5 so any subsequent attempt to retrieve the row using the old rowid will retrieve the correct row.

According to one embodiment, undo records are used to translate the old rowid to the new rowid. In one embodiment, the change in rowid is recorded by undo logs for a transaction. When a request identifies a row by its old rowid, the undo logs are used to translate the old rowid into the new rowid, so the appropriate row can be retrieved.

Compression-Level and Row-Level Locking

Because data from a compression unit may be stored in columnar-compressed format, data for a particular table row may not be stored contiguously making it difficult to isolate data for the particular table row. Thus, according to one embodiment, if a transaction requests a lock for a particular row, the entire compression unit is locked, as described in STORING COMPRESSION UNITS IN RELATIONAL TABLES.

Alternatively, instead of locking the entire compression unit that contains the row, an individual row may be locked by a transaction. In one embodiment, when a transaction requests a lock on a row, the row is migrated from column-oriented storage section 204 to row-oriented storage section 202 according to step 708. After the row has been migrated to row-oriented storage section 202, the difficulty in isolating the row is mitigated, and row-level locking techniques may be used to lock the row. As a result, a particular transaction may lock a particular row stored in a compression unit. While the particular row is locked, other transactions are prevented from writing to the row. However, data from other rows within the compression unit may be modified by the other transactions while the lock is in place.

In other embodiments, metadata is maintained for each row in the compression unit to enable row-level locking. For example, similar to a delete vector, a database server maintains metadata comprising one or more bits for each row in a compression unit. The bits specify whether the row is locked or not. If the row is locked, then the bits may also specify by which transaction the row is locked. Because additional metadata consumes more space, the locking metadata may be allocated on demand (i.e., in response to a transaction's request for a lock.) Thus, the metadata is maintained only for the duration of the lock. Once the lock is no longer needed, for example when there is a commit or rollback of the locking transaction, the metadata may be deleted.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
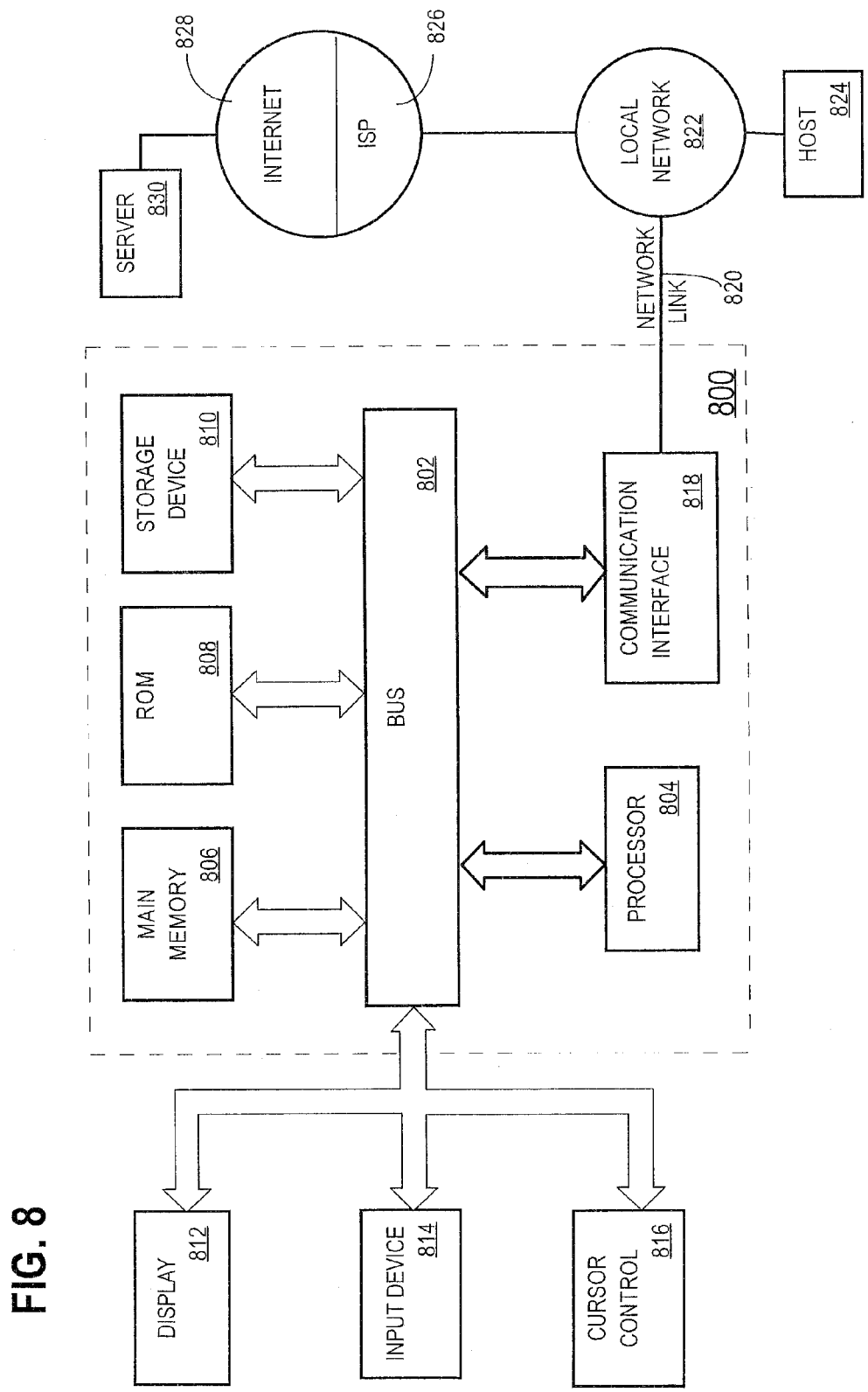
FIG. 8 is a block diagram of a computing device upon which embodiments of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   storing a plurality of rows in a compression unit, wherein a first subset of said plurality of rows are stored in a column-major format;
   in response to detecting a data-manipulation event regarding a particular row from said first subset of said plurality of rows stored in a column-major format, converting, within the compression unit, said particular row from column-major format to row-major format;
   wherein one or more other rows in the first subset of said plurality of rows remain stored in column-major format within the compression unit;
   wherein the method is performed by one or more computing devices.

2. The method of claim 1 wherein said data-manipulation event is a lock request.

3. The method of claim 1 wherein said data-manipulation event is an update to said particular row.

4. The method of claim 1, further comprising:
   in response to detecting a request to insert a new row into said plurality of rows in said compression unit, storing said new row in row-major format.

5. The method of claim 1 wherein in response to detecting a data-manipulation event:
   said particular row receives a new rowid to identify said particular row;
   wherein said new rowid is different than a previous rowid used to identify the particular row prior to said data-manipulation event; and
   mapping said previous rowid to said new rowid.

6. A method comprising:
   storing database metadata that defines properties of segments of a database table;
   wherein said database metadata defines a first set of segments as storing rows only in row-major format,
   wherein said database metadata defines a second set of segments as storing rows in column-major format;
   based on the database metadata, storing, in a compression unit, rows in said first set of segments only in row-major format; and
   based on the database metadata, storing, in the compression unit, rows in said second set of segments in column-major format.

7. The method of claim 6 wherein, in response to a request to load a set of one or more rows into a segment of said database table, said database metadata is examined to determine how to store the set of one or more rows.

8. The method of claim 6, wherein the method further comprises:
   in response to a request to load a set of one or more rows into said second set of segments, examining said database metadata;
   in response to examining said database metadata, determining that said second set of segments stores rows in column-major format;
   storing, in persistent storage, said set of one or more rows in column-major format.

9. The method of claim 6, wherein rows in said second set of segments are stored in compressed column-major format.

10. The method of claim 6, wherein a row from said second set of segments stored in column-major format is migrated to row-major format in response to a data-manipulation event.

11. A method comprising:
    determining compression parameters for storing first data in compression units of a first database table segment, in column-major format, wherein said determining includes examining said first data to determine said compression parameters;
    compressing the first data within the compression units of the first database table segment according to said compression parameters determined for storing said first data; and
    without having had examined second data to configure said compression parameters for the second data, compressing said second data stored in column-major format within compression units of a second database table segment, wherein compressing second data includes compressing said second data according to the compression parameters determined for storing said first data.

12. The method of claim 11, further comprising:
    obtaining data that indicates a first selected balance point for said first database table segment;
    wherein said first selected balance point indicates a level at which data within the first database table segment should be compressed;
    wherein said step of determining is based, at least in part, on said first selected balance point.

13. The method of claim 12, further comprising:
    obtaining data that indicates a second selected balance point for said second database table segment;
    wherein said second selected balance point indicates a level at which data within the second database table segment should be compressed;

wherein the level indicated by said second selected balance point is the same as the level indicated by said first selected balance point.

14. The method of claim 13, further comprising:
obtaining data that indicates a third selected balance point for a third database table segment;
wherein said third selected balance point indicates a level at which data within the third database table segment should be compressed;
wherein the level indicated by said third selected balance point is different than the level indicated by said first balance point;
determining compression parameters for storing third data in compression units of a third database table segment, in column-major format, wherein said determining includes, based on said third selected balance point, examining said third data to determine said compression parameters.

15. The method of claim 14, wherein said first, second, and third balance points are selected by a user when said first, second, and third database table segments are created.

16. The method of claim 11, wherein said compression parameters are stored in a compression map associated with said first database table segment.

17. The method of claim 11, wherein said step of determining is performed in response to a first request to load first data into said first database table segment, the method further comprising:
receiving a second request to load third data into said first database table segment;
without having had examined third data, compressing said third data stored in column-major format within compression units of said first database table segment, wherein compressing third data includes compressing said third data according to the compression parameters determined for storing said first data.

18. The method of claim 11, wherein said step of determining compression parameters is performed in response to receiving a request to load data into the first database table segment.

19. The method of claim 11, wherein said first and second database table segments are table partitions from a particular database table.

20. A method comprising:
storing a plurality of rows in a compression unit, wherein at least a subset of said plurality of rows is stored in column-major format;
deleting a first row from said subset by marking the row as deleted within the compression unit without physically deleting said first row from said compression unit;
storing in said compression unit data that identifies said first row as a row that has been deleted,
deleting a second row from said subset,
determining that deleting said second row deletes a threshold number of rows from said compression unit;
in response to determining that deleting said second row deletes a threshold number of rows from said compression unit:
physically deleting said first and second row from said compression unit, recompressing said compression unit.

21. One or more non-transitory computer-readable media comprising instructions that, when executed by one or more processors, cause one or more computing devices to perform operations comprising:
storing a plurality of rows in a compression unit, wherein a first subset of said plurality of rows are stored in a column-major format;
in response to detecting a data-manipulation event regarding a particular row from said first subset of said plurality of rows stored in a column-major format, converting, within the compression unit, said particular row from column-major format to row-major format;
wherein one or more other rows in the first subset of said plurality of rows remain stored in column-major format within the compression unit.

22. The non-transitory computer-readable media of claim 21 wherein said data-manipulation event is a lock request.

23. The non-transitory computer-readable media of claim 21 wherein said data-manipulation event is an update to said particular row.

24. The non-transitory computer-readable media of claim 21, wherein the instructions further cause the one or more computing devices to perform operations comprising:
in response to detecting a request to insert a new row into said plurality of rows in said compression unit, storing said new row in row-major format.

25. The non-transitory computer-readable media of claim 21 wherein the instructions further cause the one or more computing devices to perform operations comprising in response to detecting a data-manipulation event:
said particular row receives a new rowid to identify said particular row;
wherein said new rowid is different than a previous rowid used to identify the particular row prior to said data-manipulation event; and
mapping said previous rowid to said new rowid.

26. One or more non-transitory computer-readable media comprising instructions that, when executed by one or more processors, cause one or more computing devices to perform operations comprising:
storing database metadata that defines properties of segments of a database table;
wherein said database metadata defines a first set of segments as storing rows only in row-major format,
wherein said database metadata defines a second set of segments as storing rows in column-major format;
based on the database metadata, storing, in a compression unit, rows in said first set of segments only in row-major format; and
based on the database metadata, storing, in the compression unit, rows in said second set of segments in column-major format.

27. The non-transitory computer-readable media of claim 26 wherein the instructions further cause the one or more computing devices to perform operations comprising, in response to a request to load a set of one or more rows into a segment of said database table, said database metadata is examined to determine how to store the set of one or more rows.

28. The non-transitory computer-readable media of claim 26 wherein the instructions further cause the one or more computing devices to perform operations comprising:
in response to a request to load a set of one or more rows into said second set of segments, examining said database metadata;
in response to examining said database metadata, determining that said second set of segments stores rows in column-major format;
storing, in persistent storage, said set of one or more rows in column-major format.

29. The non-transitory computer-readable media of claim 26, wherein the instructions cause rows in said second set of segments are stored in compressed column-major format.

30. The non-transitory computer-readable media of claim 26 wherein the instructions further cause the one or more computing devices to perform operations comprising, wherein a row from said second set of segments stored in column-major format is migrated to row-major format in response to a data-manipulation event.

31. One or more non-transitory computer-readable media comprising instructions that, when executed by one or more processors, cause one or more computing devices to perform operations comprising:
- determining compression parameters for storing first data in compression units of a first database table segment, in column-major format, wherein said determining includes examining said first data to determine said compression parameters;
- compressing the first data within the compression units of the first database table segment according to said compression parameters determined for storing said first data; and
- without having had examined second data to configure said compression parameters for the second data, compressing said second data stored in column-major format within compression units of a second database table segment, wherein compressing second data includes compressing said second data according to the compression parameters determined for storing said first data.

32. The non-transitory computer-readable media of claim 31 wherein the instructions further cause the one or more computing devices to perform operations comprising:
- obtaining data that indicates a first selected balance point for said first database table segment;
- wherein said first selected balance point indicates a level at which data within the first database table segment should be compressed;
- wherein said step of determining is based, at least in part, on said first selected balance point.

33. The non-transitory computer-readable media of claim 32 wherein the instructions further cause the one or more computing devices to perform operations comprising:
- obtaining data that indicates a second selected balance point for said second database table segment;
- wherein said second selected balance point indicates a level at which data within the second database table segment should be compressed;
- wherein the level indicated by said second selected balance point is the same as the level indicated by said first selected balance point.

34. The non-transitory computer-readable media of claim 33 wherein the instructions further cause the one or more computing devices to perform operations comprising:
- obtaining data that indicates a third selected balance point for a third database table segment;
- wherein said third selected balance point indicates a level at which data within the third database table segment should be compressed;
- wherein the level indicated by said third selected balance point is different than the level indicated by said first balance point;
- determining compression parameters for storing third data in compression units of a third database table segment, in column-major format, wherein said determining includes, based on said third selected balance point, examining said third data to determine said compression parameters.

35. The non-transitory computer-readable media of claim 34, wherein said first, second, and third balance points are selected by a user when said first, second, and third database table segments are created.

36. The non-transitory computer-readable media of claim 31, wherein said compression parameters are stored in a compression map associated with said first database table segment.

37. The non-transitory computer-readable media of claim 31, wherein the instructions cause said step of determining in response to a first request to load first data into said first database table segment, the instructions further causing operations comprising:
- receiving a second request to load third data into said first database table segment;
- without having had examined third data, compressing said third data stored in column-major format within compression units of said first database table segment, wherein compressing third data includes compressing said third data according to the compression parameters determined for storing said first data.

38. The non-transitory computer-readable media of claim 31, wherein the instructions cause said step of determining compression parameters in response to receiving a request to load data into the first database table segment.

39. The non-transitory computer-readable media of claim 31, wherein said first and second database table segments are table partitions from a particular database table.

40. One or more non-transitory computer-readable media comprising instructions that, when executed by one or more processors, cause one or more computing devices to perform operations comprising:
- storing a plurality of rows in a compression unit, wherein at least a subset of said plurality of rows is stored in column-major format;
- deleting a first row from said subset by marking the row as deleted within the compression unit without physically deleting said first row from said compression unit;
- storing in said compression unit data that identifies said first row as a row that has been deleted;
- deleting a second row from said subset,
- determining that deleting said second row deletes a threshold number of rows from said compression unit;
- in response to determining that deleting said second row deletes a threshold number of rows from said compression unit:
  - physically deleting said first and second row from said compression unit, recompressing said compression unit.

* * * * *

UNITED STATES PATENT AND TRADEMARK OFFICE
CERTIFICATE OF CORRECTION

PATENT NO. : 8,583,692 B2  
APPLICATION NO. : 12/871882  
DATED : November 12, 2013  
INVENTOR(S) : Ganesh et al.

Page 1 of 1

It is certified that error appears in the above-identified patent and that said Letters Patent is hereby corrected as shown below:

Title page, Item (57) "Abstract", line 3, delete "row-level" and insert -- row-major --, therefor.

In the Specification

In column 2, line 60, delete "and." and insert -- and --, therefor.

In column 5, line 44, delete "subpartioned" and insert -- subpartitioned --, therefor.

Signed and Sealed this  
Third Day of June, 2014

Michelle K. Lee  
*Deputy Director of the United States Patent and Trademark Office*